United States Patent
Dietrich et al.

(10) Patent No.: US 10,112,866 B2
(45) Date of Patent: *Oct. 30, 2018

(54) COATED ARTICLE WITH LOW-E COATING HAVING ABSORBING LAYERS FOR LOW FILM SIDE REFLECTANCE AND LOW VISIBLE TRANSMISSION

(71) Applicant: Guardian Glass, LLC, Auburn Hills, MI (US)

(72) Inventors: Anton Dietrich, Fontnas (CH); Bernd Disteldorf, Mettlach (DE); Piotr Kokot, Czestochowa (PL); Adam Tokarz, Czestochowa (PL)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,401

(22) Filed: Mar. 19, 2018

(65) Prior Publication Data

US 2018/0208502 A1    Jul. 26, 2018

Related U.S. Application Data

(63) Continuation of application No. 15/098,344, filed on Apr. 14, 2016, now Pat. No. 9,919,961, which is a
(Continued)

(51) Int. Cl.
*C03C 17/36* (2006.01)
*B32B 17/06* (2006.01)
(Continued)

(52) U.S. Cl.
CPC .............. *C03C 17/366* (2013.01); *B32B 5/00* (2013.01); *B32B 7/02* (2013.01); *B32B 17/06* (2013.01);
(Continued)

(58) Field of Classification Search
CPC .................................................... C03C 17/366
See application file for complete search history.

(56) References Cited

U.S. PATENT DOCUMENTS

| | | |
|---|---|---|
| 4,450,201 A | 5/1984 | Brill |
| 5,214,530 A | 5/1993 | Coombs et al. |
| | (Continued) | |

FOREIGN PATENT DOCUMENTS

| | | |
|---|---|---|
| EP | 0 567 735 | 11/1993 |
| EP | 0 722 913 | 7/1996 |
| | (Continued) | |

OTHER PUBLICATIONS

U.S. Appl. No. 15/098,344, filed Apr. 14, 2016; Dietrich et al.
(Continued)

*Primary Examiner* — Frank J Vineis
*Assistant Examiner* — Z. Jim Yang
(74) *Attorney, Agent, or Firm* — Nixon & Vanderhye P.C.

(57) ABSTRACT

Absorbing layers of a low-emissivity (low-E) coating are designed to cause the coating to have a reduced film side reflectance which is advantageous for aesthetic purposes. In certain embodiments, the absorbing layers are metallic or substantially metallic (e.g., NiCr or $NiCrN_x$) and are each provided between first and second nitride layers (e.g., silicon nitride based layers) in order to reduce or prevent oxidation of the absorbing layers during optional heat treatment (e.g., thermal tempering, heat bending, and/or heat strengthening). Coated articles according to certain example embodiments of this invention may be used in the context of insulating glass (IG) window units, other types of windows, etc.

11 Claims, 2 Drawing Sheets

Related U.S. Application Data continuation of application No. 14/852,834, filed on Sep. 14, 2015, now Pat. No. 9,328,017, which is a continuation of application No. 13/606,276, filed on Sep. 7, 2012, now Pat. No. 9,150,003.

(51) Int. Cl.
  *B32B 7/02* (2006.01)
  *B32B 5/00* (2006.01)

(52) U.S. Cl.
  CPC ...... *C03C 17/3618* (2013.01); *C03C 17/3626* (2013.01); *C03C 17/3639* (2013.01); *C03C 17/3642* (2013.01); *C03C 17/3644* (2013.01); *C03C 17/3649* (2013.01); *C03C 17/3652* (2013.01); *C03C 17/3681* (2013.01); *C03C 17/3613* (2013.01); *Y10T 428/2495* (2015.01); *Y10T 428/265* (2015.01)

(56) References Cited

U.S. PATENT DOCUMENTS

| | | |
|---|---|---|
| 6,804,048 B2 | 10/2004 | MacQuart et al. |
| 7,521,096 B2 | 4/2009 | Lemmer et al. |
| 7,597,964 B2 | 10/2009 | Krasnov |
| 7,597,965 B2 | 10/2009 | Blacker et al. |
| 7,648,769 B2 | 1/2010 | Blacker et al. |
| 7,771,830 B2 | 8/2010 | Neuman et al. |
| 7,858,191 B2 | 12/2010 | Lemmer et al. |
| 7,879,448 B2 | 2/2011 | Dietrich et al. |
| 8,017,243 B2 | 9/2011 | Blacker et al. |
| 8,017,244 B2 | 9/2011 | Hevesi |
| 8,101,278 B2 | 1/2012 | Laird |
| 8,142,622 B2 | 3/2012 | Ferreira et al. |
| 8,173,263 B2 | 5/2012 | Lingle et al. |
| 8,337,988 B2 | 12/2012 | Knoll et al. |
| 9,150,003 B2 | 10/2015 | Dietrich et al. |
| 9,328,017 B2 | 5/2016 | Dietrich et al. |
| 9,919,961 B2 | 3/2018 | Dietrich et al. |
| 2003/0049464 A1 | 3/2003 | Glenn et al. |
| 2004/0121165 A1 | 6/2004 | Laird |
| 2005/0123772 A1 | 6/2005 | Coustet |
| 2005/0164015 A1 | 7/2005 | Laird et al. |
| 2005/0196622 A1 | 9/2005 | Laird |
| 2005/0202254 A1 | 9/2005 | Nunez-Regueiro et al. |
| 2006/0008656 A1 | 1/2006 | Veerasamy |
| 2006/0046018 A1 | 3/2006 | Lemmer et al. |
| 2006/0121290 A1 | 6/2006 | Chonlamaitri |
| 2006/0292381 A1 | 12/2006 | Kriltz et al. |
| 2007/0036986 A1 | 2/2007 | Chonlamaitri |
| 2007/0036987 A1 | 2/2007 | Landa et al. |
| 2007/0281171 A1 | 12/2007 | Coster |
| 2008/0008876 A1 | 1/2008 | Laird |
| 2008/0070044 A1 | 3/2008 | Blacker |
| 2008/0138547 A1 | 6/2008 | Maschwitz |
| 2009/0047466 A1 | 2/2009 | German et al. |
| 2009/0136765 A1 | 5/2009 | Maschwitz |
| 2009/0324934 A1 | 12/2009 | Blacker |
| 2009/0324967 A1 | 12/2009 | Disteldorf et al. |
| 2010/0062245 A1 | 3/2010 | Martin |
| 2010/0221575 A1 | 9/2010 | Stull |
| 2010/0255294 A1 | 10/2010 | Yaoita |
| 2011/0135955 A1 | 6/2011 | Maschwitz et al. |
| 2011/0189401 A1 | 8/2011 | Czika et al. |
| 2011/0261442 A1 | 10/2011 | Knoll |
| 2011/0262726 A1 | 10/2011 | Knoll |
| 2011/0300319 A1 | 12/2011 | Reymond et al. |
| 2011/0305853 A1 | 12/2011 | Reymond et al. |
| 2012/0087005 A1 | 4/2012 | Reymond |
| 2012/0219821 A1 | 8/2012 | Frank |
| 2012/0225304 A1 | 9/2012 | Imran et al. |
| 2012/0225317 A1 | 9/2012 | Imran et al. |
| 2014/0072784 A1 | 3/2014 | Dietrich |
| 2014/0272453 A1 | 9/2014 | Polcyn |

FOREIGN PATENT DOCUMENTS

| | | |
|---|---|---|
| EP | 2 030 954 | 3/2009 |
| RU | 2 090 919 | 9/1997 |
| WO | WO 2004/101850 | 11/2004 |
| WO | WO 2006/124503 | 11/2006 |
| WO | WO 2008/060453 | 5/2008 |
| WO | WO 2009/067263 | 5/2009 |
| WO | WO 2010 072973 | 7/2010 |
| WO | WO 2010/072974 | 7/2010 |

OTHER PUBLICATIONS

U.S. Appl. No. 14/852,834, filed Sep. 14, 2015; Dietrich et al.
U.S. Appl. No. 13/606,276, filed Sep. 7, 2012; Dietrich et al.
U.S. Appl. No. 13/317,176, filed Oct. 12, 2011; O'Connor et al.

COATED ARTICLE WITH LOW-E COATING HAVING ABSORBING LAYERS FOR LOW FILM SIDE REFLECTANCE AND LOW VISIBLE TRANSMISSION

This application is a continuation of application Ser. No. 15/098,344, filed Apr. 14, 2016 (now U.S. Pat. No. 9,919,961), which is a continuation of application Ser. No. 14/852,834, filed Sep. 14, 2015 (now U.S. Pat. No. 9,328,017), which is a continuation of application Ser. No. 13/606,276, filed Sep. 7, 2012 (now U.S. Pat. No. 9,150,003), the entire disclosures of which are all hereby incorporated herein by reference in this application.

This invention relates to a coated article including a low-E coating. In certain example embodiments, absorbing layers of the low-E coating are positioned/designed to cause the coating to have both (i) a low visible transmission (e.g., no greater than 50%, more preferably no greater than 40%, and most preferably no greater than 35%), and (ii) a reduced visible film side reflectance. An absorbing layer may be provided in an upper stack and another absorbing layer may be provided in a lower stack of the low-E coating. In certain example embodiments, the absorbing layers are metallic or substantially metallic and are each provided between first and second nitride layers (e.g., silicon nitride based layers) in order to reduce or prevent oxidation of the absorbing layers during optional heat treatment (e.g., thermal tempering, heat bending, and/or heat strengthening) and/or manufacturing thereby permitting predictable coloration and optical characteristics to be achieved. Coated articles according to certain example embodiments of this invention may be used in the context of insulating glass (IG) window units, vehicle windows, other types of windows, or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like in certain example instances. Heat treatment of coated articles typically requires use of temperature(s) of at least 580 degrees C., more preferably of at least about 600 degrees C. and still more preferably of at least 620 degrees C. Such high temperatures (e.g., for 5-10 minutes or more) often cause coatings to break down and/or deteriorate or change in an unpredictable manner. Thus, it is desirable for coatings to be able to withstand such heat treatments (e.g., thermal tempering), if desired, in a predictable manner that does not significantly damage the coating.

In certain situations, designers of coated articles strive for a combination of desirable visible transmission, desirable color, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors. Often, more IR radiation being blocked (including reflected) is accompanied by less visible transmission.

U.S. Pat. No. 7,597,965 discloses a low-E coating with an NiCr absorber layer in the lower dielectric stack. However, the example coating in the '965 patent is designed for a high visible transmission, and indeed has a visible transmission ($T_{vis}$ or TY) of 59%. Lower visible transmissions are often desirable. For example, it is often desirable for aesthetic and/or optical purposes to provide coated articles (including low-E coatings) having visible transmissions of no greater than 50%, more preferably no greater than 40%, and sometimes no greater than 35%. However, when visible transmission of a coated article is reduced via a low-E coating design, the film side reflectance of the coating typically increases.

U.S. Pat. No. 7,648,769 discloses a low-E coating with an NiCr absorber layer provided in the middle dielectric stack, but not in the upper and lower dielectric stacks of the coating (e.g., see FIG. 1 of the '769 patent). Example 1 in the '769 patent realizes, measured monolithically, a visible transmission of 54.5% and a film side reflectance of 19.5%, and when measured in an insulating glass (IG) window unit the values change to a visible transmission of 50% and a film side reflectance of 23%. In a similar manner, Example 2 in the '769 patent realizes, measured monolithically, a visible transmission of 67.5% and a film side reflectance of 11.5%, and when measured in an insulating glass (IG) window unit the values change to a visible transmission of 62% and a film side reflectance of 17%. It will be appreciated that the examples in the '769 patent do not realize a simultaneous combination of both (i) low visible transmission, and (ii) low film side reflectance. Instead, the examples in the '769 patent teach that when visible transmission goes down, film side reflectance goes up.

It will also be explained herein, in the detailed description section, that providing an absorber layer only in the middle dielectric stack of a low-E coating having a visible transmission of about 40% results in an undesirably high visible film side reflectance (RfY) of over 30%.

Thus, it will be appreciated that it has been difficult to achieve coated articles, including low-E coatings, having a combination of both (i) desirably low visible transmission, and (ii) low film side reflectance. It will be apparent to those skilled in the art that there exists a need in the art for a coated article having low emissivity (or low sheet resistance) and a combination of both low visible transmission (e.g., no greater than 50%, more preferably no greater than about 40%, and most preferably no greater than about 35%) and low film side reflectance.

BRIEF SUMMARY OF EXAMPLE EMBODIMENTS OF THE INVENTION

A coated article includes a low-E coating. In certain example embodiments, absorbing layers in the low-E coating are positioned/designed to cause the low-E coating to have both (i) a low visible transmission (e.g., no greater than 50%, more preferably no greater than 40%, and most preferably no greater than 35%), and (ii) low visible film side reflectance which is advantageous for aesthetic purposes. An absorbing layer is be provided in an upper stack of the low-E coating and another absorbing layer is provided in a lower stack of the low-E coating, and in certain double-silver embodiments no similar absorbing layer is provided in the center stack of the low-E coating. The absorbing layers are metallic or substantially metallic (e.g., NiCr or $NiCrN_x$), and in certain example embodiments are each provided between first and second nitride layers (e.g., silicon nitride based layers) in order to reduce or prevent oxidation of the absorbing layers during optional heat treatment (e.g., thermal tempering, heat bending, and/or heat strengthening) and/or manufacturing thereby permitting predictable coloration and optical characteristics to be achieved. It has been found that the use of such absorbing layers in the top and bottom portions of the coating, but not in the middle dielectric stack of the coating between the silver layers, surprisingly and unexpectedly allows for a combination of low visible transmission and low film side reflectance to be simultaneously realized. In certain example embodiments, the coated article's visible film side reflectance (RfY) may be less than its visible glass side reflectance (RgY), in IG and/or monolithic applications. Coated articles according to certain example embodiments of this invention may be used in the context of IG window units, vehicle windows, other types of windows, or in any other suitable application.

In certain example embodiments of this invention, there is provided a coated article including a coating supported by a glass substrate, the coating comprising: first and second infrared (IR) reflecting layers, wherein said IR reflecting layers are spaced apart from one another by at least one dielectric layer that is located therebetween, and wherein the first IR reflecting layer is located closer to the glass substrate than is the second IR reflecting layer, a first substantially metallic or metallic absorption layer located such that the first absorption layer is located between the glass substrate and the first IR reflecting layer, a second substantially metallic or metallic absorption layer located such that both the first and second IR reflecting layers are located between the glass substrate and the second absorption layer, and wherein the first absorption layer and the second absorption layer are each sandwiched between and contacting dielectric layers comprising silicon nitride.

DETAILED DESCRIPTION OF EXAMPLE EMBODIMENTS OF THE INVENTION

Coated articles herein may be used in applications such as IG window units, vehicle windows, monolithic architectural windows, residential windows, and/or any other suitable application that includes single or multiple glass substrates.

Figure 1:
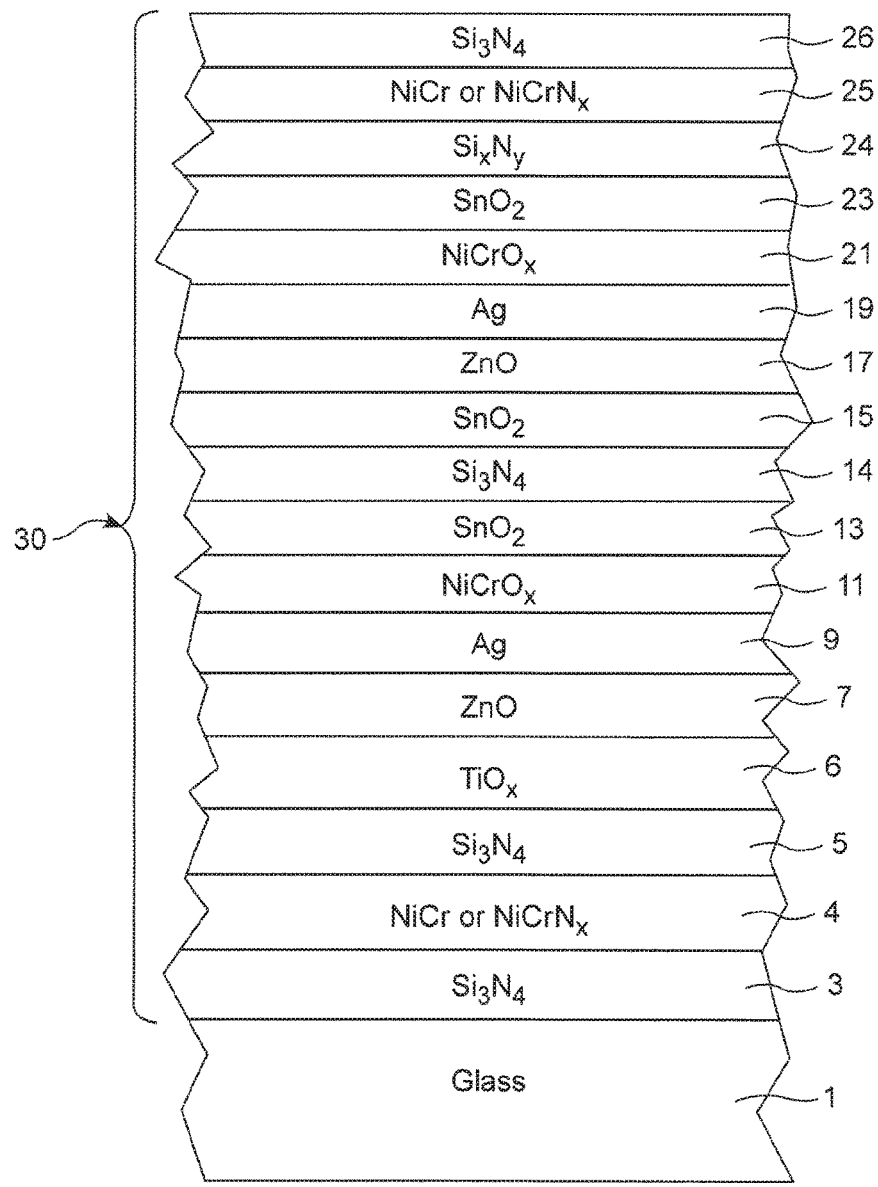
FIG. 1 is a cross sectional view of a coated article according to an example embodiment of this invention.

In certain example embodiments of this invention, the coating includes a double-silver stack (as shown in FIG. 1), although this invention is not so limited in all instances.

For example, in certain example embodiments of this invention, heat treated or non-heat-treated coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.1, and most preferably less than or equal to 2.0). The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of at least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and low-E coating (or layer system) 30 provided on the substrate 1 either directly or indirectly. The coating (or layer system) 30 includes, for example: bottom dielectric silicon nitride layer 3 which may be $Si_3N_4$, of the Si-rich type for haze reduction, or of any other suitable stoichiometry silicon nitride in different embodiments of this invention, metallic or substantially metallic absorbing layer 4 (e.g., of or including NiCr, $NiCrN_x$, or the like), additional dielectric silicon nitride layer 5 which may be $Si_3N_4$, of the Si-rich type for haze reduction, or of any other suitable stoichiometry silicon nitride, optional dielectric layer 6 of or including titanium oxide or any other suitable material, first lower contact layer 7 (which contacts bottom IR reflecting layer 9), first conductive and preferably metallic or substantially metallic infrared (IR) reflecting layer 9, first upper contact layer 11 (which contacts layer 9), dielectric layer 13, another silicon nitride based and/or inclusive layer 14, tin oxide inclusive based and/or inclusive interlayer 15, second lower contact layer 17 (which contacts IR reflecting layer 19), second conductive and preferably metallic or substantially metallic IR reflecting layer 19, second upper contact layer 21 (which contacts layer 19), dielectric layer 23, dielectric silicon nitride layer 24 which may be $Si_3N_4$, of the Si-rich type for haze reduction, or of any other suitable stoichiometry silicon nitride in different embodiments of this invention, metallic or substantially metallic absorbing layer 25 (e.g., of or including NiCr, $NiCrN_x$, or the like), and overcoat dielectric silicon nitride layer 26 which may be $Si_3N_4$, of the Si-rich type for haze reduction, or of any other suitable stoichiometry silicon nitride. The "contact" layers 7, 11, 17 and 21 each contact at least one IR reflecting layer (e.g., layer based on Ag). The aforesaid sputter-deposited layers 3-26 make up low-E (i.e., low emissivity) coating 30 that is provided on glass or plastic substrate 1.

Figure 2:
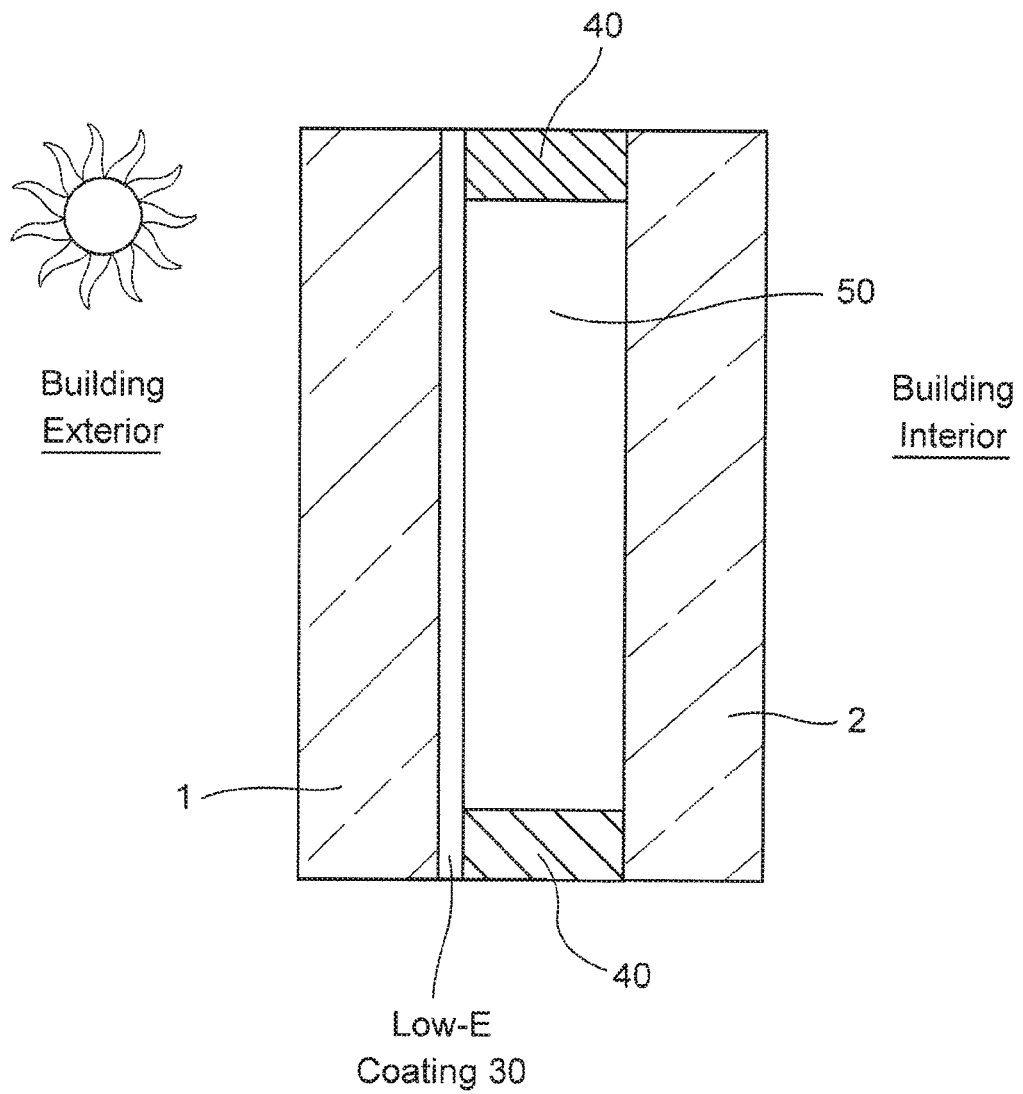
FIG. 2 is a cross sectional view showing the coated article of FIG. 1 provided in an IG window unit according to an example embodiment of this invention.

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Patent Document No. 2004/0005467, the disclosure of which is hereby incorporated herein by reference. FIG. 2 shows an example IG window unit including the coated glass substrate 1 shown in FIG. 1 coupled to another glass substrate 2 via spacer(s), sealant(s) 40 or the like, with a gap 50 being defined therebetween. This gap 50 between the substrates in IG unit embodiments may in certain instances be filled with a gas such as argon (Ar). An example IG unit may comprise a pair of spaced apart clear glass substrates each about 3-4 mm thick, one of which is coated with a coating 30 herein in certain example instances, where the gap 50 between the substrates may be from about 5 to 30 mm, more preferably from about 10 to 20 mm, and most preferably about 16 mm. In certain example instances, the coating 30 may be provided on the interior surface of either substrate facing the gap (the coating is shown on the interior major surface of substrate 1 in FIG. 2 facing the gap 50, but instead could be on the interior major surface of substrate 2 facing the gap 50). Either substrate 1 or substrate 2 may be the outermost substrate of the IG window unit at the building exterior (e.g., in FIG. 2 the substrate 1 is the substrate closest to the building exterior).

Absorption layer 4 is, in certain example embodiments of this invention, located between and contacting nitride based dielectric layers 3 and 5. In certain example embodiments, each of layers 3 and 5 surrounding the absorption layer 4 is a nitride layer and is substantially or entirely non-oxidized. Likewise, absorption layer 25 is, in certain example embodiments of this invention, located between and contacting nitride based dielectric layers 24 and 26. In certain example embodiments, each of layers 24 and 26 surrounding the absorption layer 25 is a nitride layer and is substantially or entirely non-oxidized. Optionally, the outermost portion of layer 26 may be oxided if it is the outermost layer of the coating 30 and exposed to atmosphere. The use of nitride layers 3, 5, 24, 26 around the absorber layers 4 and 25 is advantageous in that it helps prevent (or reduce the likelihood of) the absorption layers 4, 25 from being oxidized during heat treatment, thereby better allowing the absorption layers 4, 25 to perform an intended function, in particular absorbing at least some amount (e.g., at least 5%, more preferably at least 10%) of visible light. It will be appreciated that if a layer becomes too oxidized during heat treatment or the like, it no longer can function as an adequate absorption layer.

In certain example embodiments of this invention, absorption layers 4 and 25 may be of or include NiCr (any suitable ratio or Ni:Cr), and may or may not be nitrided (NiCrN$_x$). Absorption layers 4 and 25 are located between and contacting nitride based dielectric layers as shown in FIG. 1. In certain example embodiments, each of the nitride based layers 3, 5, 24, 26 surrounding the absorption layers 4, 25 is a nitride layer and is substantially or entirely non-oxidized. In certain example embodiments, absorption layers 4, 25 may comprise from 0-10% oxygen, more preferably from 0-5% oxygen, and most preferably from 0-2% oxygen (atomic %). In certain example embodiments, absorption layers 4, 25 comprise from 0-20% nitrogen, more preferably from 1-15% nitrogen, and most preferably from about 1-12% nitrogen (atomic %). While NiCr is a preferred material for the absorption layers 4 and 25, it is possible that other materials may instead be used. For example, in certain other heat treatable example embodiments of this invention, the absorption layers 4 and/or 25 may be of or include Ni, Cr, NiCrN$_x$, CrN, ZrN, or TiN. In non-heat treatable embodiments, any of the aforesaid materials may be used for the absorption/absorbing layers 4 and/or 25, as well as other materials such as Ti, Zr, NiOx or the like.

The absorbing layers 4 and 25 of the low-E coating 30 are designed to cause the coating 30 to have a lower visible transmission, desirable coloration, and low film side reflectance. In certain example embodiments, the metallic or substantially metallic absorbing layers (e.g., NiCr or NiCrN$_x$) 4 and 25 may each be from about 80-250 angstroms (Å) thick, more preferably from about 100-210 angstroms (Å) thick, and most preferably from about 140-190 angstroms (Å) thick. In certain example embodiments, the lower absorbing layer 4 may be slightly thinner than the upper absorbing layer 25. For example, in certain example embodiments, the lower absorbing layer 4 may be from about 3-50 angstroms (Å) thinner (more preferably from about 3-20 angstroms thinner) than the upper absorbing layer 25, in order to provide for desirable optical characteristics of the coated article. In certain example embodiments, each metallic or substantially metallic absorbing layer 4, 25 is provided between first and second nitride layers (e.g., silicon nitride based layers) 3, 5, 24, 26 in order to reduce or prevent oxidation thereof during heat treatment (e.g., thermal tempering, heat bending, and/or heat strengthening) thereby permitting predictable coloration, transmission, and reflectance values to be achieved following heat treatment.

Thus, an absorbing layer 25 is provided in the upper stack (above the upper Ag based IR reflecting layer 19), and a second absorbing layer 4 is provided in the lower stack (between the glass substrate 1 and the lower Ag based IR reflecting layer 9). Preferably, in certain double-silver embodiments (i.e., where the low-E coating has two Ag-based IR reflecting layers), no similar absorbing layer is provided in the center dielectric stack between a pair of nitride layers. In other words, while absorber layers 4 and 25 are provided in lower and upper portions of the coating, there is no similar absorber layer between nitrides provided in the center stack between the two Ag based layers 9 and 19. It has been found that the use of such absorbing layers 4 and 25 in the bottom and top portions of the coating respectively, but not in the middle part of the coating between the silvers, surprisingly and unexpectedly allows for a combination of low visible transmission and low film side reflectance to be simultaneously realized in the coated article including coating 30. In certain example embodiments, the coated article's visible film side reflectance (RfY) may be less than its visible glass side reflectance (RgY), in IG and/or monolithic applications.

Dielectric layers 3, 5, 14, 24 and 26 may be of or include silicon nitride in certain embodiments of this invention. Silicon nitride layers 3, 5, 14, 24 and 26 may, among other things, improve heat-treatability of the coated articles and protect the absorbing layers during optional HT, e.g., such as thermal tempering or the like. One or more of the silicon nitride of layers 3, 5, 14, 24 and 26 may be of the stoichiometric type (i.e., Si$_3$N$_4$), or alternatively of the Si-rich type of silicon nitride in different embodiments of this invention. The presence of free Si in a Si-rich silicon nitride inclusive layer 3 and/or 5 may allow certain atoms such as sodium (Na) which migrate outwardly from the glass 1 during HT to be more efficiently stopped by the Si-rich silicon nitride inclusive layer(s) before they can reach the silver 9 and damage the same. Thus, it is believed that the Si-rich Si$_x$N$_y$ can reduce the amount of damage done to the silver layer(s) during HT in certain example embodiments of this invention thereby allowing sheet resistance (R$_s$) to decrease or remain about the same in a satisfactory manner. Moreover, it is believed that the Si-rich Si$_x$N$_y$ in layers 3, 5, 24 and/or 26 can reduce the amount of damage (e.g., oxidation) done to absorbing layer 4 (and/or 25) during HT in certain example optional embodiments of this invention. In certain example embodiments, when Si-rich silicon nitride is used, the Si-rich silicon nitride layer as deposited may be characterized by Si$_x$N$_y$ layer(s), where x/y may be from 0.76 to 1.5, more preferably from 0.8 to 1.4, still more preferably from 0.82 to 1.2. Moreover, in certain example embodiments, before and/or after HT the Si-rich Si$_x$N$_y$ layer(s) may have an index of refraction "n" of at least 2.05, more preferably of at least 2.07, and sometimes at least 2.10 (e.g., 632 nm) (note: stoichiometric Si$_3$N$_4$ which may also be used has an index "n" of 2.02-2.04). It is noted that n and k tend to drop due to heat treatment. Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl, in an atmosphere having argon and nitrogen gas, in certain embodiments of this invention. Small amounts of oxygen may also be provided in certain instances in the silicon nitride layers.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention.

The upper contact layers 11 and 21 may be of or include nickel (Ni) oxide, chromium/chrome (Cr) oxide, NiCr, or a nickel alloy oxide such as nickel chrome oxide (NiCrO$_x$), or other suitable material(s), in certain example embodiments of this invention. The use of, for example, NiCrO$_x$ in these layers (11 and/or 21) allows durability to be improved. The NiCrO$_x$ of layers 11 and/or 21 may be fully oxidized in certain embodiments of this invention (i.e., fully stoichiometric), or alternatively may only be partially oxidized. In certain instances, the NiCrO$_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire IR reflecting layer.

Dielectric layers 13 and 23 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form ZnAlO$_x$). For example, in certain example embodiments of this invention, one or more of zinc oxide layers 7, 17 may be doped with from about 1 to 10% Al, more preferably from about 1 to 5% Al, and most preferably about 1 to 4% Al.

Interlayer 15 of or including tin oxide is provided under IR reflecting layer 19 so as to be located between silicon nitride layer 14 and zinc oxide layer 17. The use of such a tin oxide inclusive interlayer 15 results in numerous improvements compared to a situation where the layer is not provided. For example, it has been found that the use of such a tin oxide inclusive interlayer 15 results in a coated article which is capable of realizing: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, (g) improved haze characteristics following heat treatment, and/or (h) improved mechanical durability such as scratch resistance before and/or after heat treatment. Thus, in certain example embodiments of this invention, coated articles may be taken to higher temperatures during heat treatment and/or for longer times without suffering undesirable significant transmission drops and/or increases in sheet resistance. In certain alternative embodiments, it is possible to dope the tin oxide of layer 15 with other materials such as Al, Zn or the like. Alternatively, other metal oxide(s) may be used for layer 15 in certain instances.

Dielectric layer 6 may be of or include titanium oxide in certain example embodiments of this invention. The titanium oxide layer may be of or include TiO$_2$, or any other suitable stoichiometry in different example embodiments.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1 embodiment are as follows, from the glass substrate outwardly:

Example Materials/Thicknesses; FIG. 1 Embodiment

| Layer<br>Glass (1-10 mm thick) | Preferred<br>Range (Å) | More Preferred (Å) | Example (Å) |
|---|---|---|---|
| Si$_x$N$_y$ (layer 3) | 40-250 Å | 100-200 Å | 140 Å |
| NiCr (layer 4) | 100-220 Å | 120-200 Å | 159 Å |
| Si$_x$N$_y$ (layer 5) | 40-450 Å | 70-300 Å | 210 Å |
| TiO$_x$ (layer 6) | 60-300 Å | 100-200 Å | 150 Å |
| ZnO$_x$ (layer 7) | 10-300 Å | 60-150 Å | 100 Å |
| Ag (layer 9) | 50-200 Å | 60-110 Å | 84 Å |
| NiCrO$_x$ (layer 11) | 10-100 Å | 12-40 Å | 30 Å |
| SnO$_2$ (layer 13) | 0-1,000 Å | 200-700 Å | 240 Å |
| Si$_x$N$_y$ (layer 14) | 50-450 Å | 80-200 Å | 110 Å |
| SnO$_2$ (layer 15) | 30-250 Å | 50-200 Å | 80 Å |
| ZnO$_x$ (layer 17) | 10-300 Å | 40-130 Å | 60 Å |
| Ag (layer 19) | 50-200 Å | 70-180 Å | 91 Å |
| NiCrO$_x$ (layer 21) | 10-100 Å | 20-45 Å | 30 Å |
| SnO$_2$ (layer 23) | 0-750 Å | 30-180 Å | 80 Å |
| Si$_3$N$_4$ (layer 24) | 40-240 Å | 60-160 Å | 90 Å |
| NiCr (layer 25) | 10-60 Å | 12-30 Å | 17 Å |
| Si$_x$N$_y$ (layer 26) | 40-450 Å | 70-300 Å | 120 Å |

It can be seen that the bottom absorber layer 4 is substantially thicker than the upper absorber layer 25. For example, in certain embodiments the bottom absorber layer 4 is at least 40 Å thicker than the upper absorber layer 25, more preferably at least 60 Å thicker, and even more preferably at least 80 Å thicker. Also, it can be seen that for one or both of the absorber layers 4 and/or 25, the bottom silicon nitride layer (3 and/or 24) is thinner than the top silicon nitride layer (5 and/or 26). For example, surrounding absorber layer 4 and/or 25, in certain embodiments the bottom silicon nitride layer (3 and/or 24) is at least 10 Å thinner than the top silicon nitride layer (5 and/or 26), more preferably at least about 20 Å or 30 Å thinner.

In certain example embodiments of this invention, coated articles herein may have the following optical and solar characteristics set forth in Table 2 when measured monolithically. The sheet resistances ($R_s$) herein take into account all IR reflecting layers (e.g., silver layers 9, 19).

Optical/Solar Characteristics (Monolithic; Pre-HT)

| Characteristic | General | More Preferred | Most Preferred |
| --- | --- | --- | --- |
| $R_s$ (ohms/sq.): | <=3.5 | <=2.5 | <=2.2 |
| $E_n$: | <=0.07 | <=0.04 | <=0.03 |
| $T_{vis}$ (Ill. C. 2°): | 20-50% | 20-43% | 24-33% |
| $R_fY$ (Ill. C., 2 deg.): | <=15% | <=12% | <=11% |
| $R_gY$ (Ill. C., 2 deg.): | <=25% | <=22% | <=22% |

In certain example embodiments, coated articles herein may have the following characteristics, measured monolithically for example, after heat treatment (HT):

Optical/Solar Characteristics (Monolithic; Post-HT)

| Characteristic | General | More Preferred | Most Preferred |
| --- | --- | --- | --- |
| $R_s$ (ohms/sq.): | <=3.0 | <=2.1 | <=1.9 |
| $E_n$: | <=0.07 | <=0.04 | <=0.03 |
| $T_{vis}$ (Ill. C. 2°): | 20-50% | 20-43% | 24-33% |
| $R_fY$ (Ill. C., 2 deg.): | <=15% | <=12% | <=11% |
| $R_gY$ (Ill C., 2 deg.): | <=25% | <=22% | <=22% |

Moreover, in certain example laminated embodiments of this invention, coated articles herein which have been optionally heat treated to an extent sufficient for tempering, and which have been coupled to another glass substrate to form an IG unit, may have the following IG unit optical/solar characteristics in a structure as shown in FIG. 2 (e.g., where the two glass sheets are 4 mm thick and 6 mm thick respectively of clear glass with a 16 mm gap therebetween filled with 90/10 argon/air). It can be seen that the film side reflection increases when placed in an IG window unit.

Example Optical Features (IG Unit Pre or Post-HT)

| Characteristic | General | More Preferred |
| --- | --- | --- |
| $T_{vis}$ (or TY)(Ill. C 2°): | 18-45% | 20-31% |
| $a^*_t$ (Ill. C. 2°): | −8 to +1.0 | −6 to 0.0 |
| $b^*_t$ (Ill. C. 2°): | −17 to +5 | −15 to +2 |
| $R_fY$ (Ill. C., 2 deg.): | <=20% | <=16% |
| $a^*_f$ (Ill. C., 2°): | −3 to +10 | 0 to +7 |
| $b^*_f$ (Ill. C., 2°): | −26 to +10.0 | −22 to 0 |
| $R_gY$ (Ill. C., 2 deg.): | 10-30% | 15-25% |
| $a^*_g$ (Ill. C., 2°): | −7 to +4 | −5 to +1 |
| $b^*_g$ (Ill. C., 2°): | −12 to +5 | −8 to 0 |

The following examples are provided for purposes of example only, and are not intended to be limiting unless specifically claimed.

EXAMPLES

The following Example 1 was made via sputtering on 6 mm thick clear glass substrate so as to have approximately the layer stack set forth below. Example 1 is according to example embodiments of this invention as shown in FIG. 1, whereas the Comparative Example (CE) below has an NiCr absorbing layer only in the middle of the stack and is provided for purposes of comparison. Example 1 had approximately the following layer stack, where the thicknesses are in units of angstroms (Å), and the NiCr absorbing layers 4 and 25 were slightly nitrided.

Example 1

| Layer Glass (6 mm thick) | Thickness (Å) |
| --- | --- |
| $Si_xN_y$ (layer 3) | 140 Å |
| NiCr (layer 4) | 159 Å |
| $Si_xN_y$ (layer 5) | 210 Å |
| $TiO_x$ (layer 6) | 150 Å |
| $ZnO_x$ (layer 7) | 100 Å |
| Ag (layer 9) | 84 Å |
| $NiCrO_x$ (layer 11) | 30 Å |
| $SnO_2$ (layer 13) | 240 Å |
| $Si_xN_y$ (layer 14) | 110 Å |
| $SnO_2$ (layer 15) | 80 Å |
| $ZnO_x$ (layer 17) | 60 Å |
| Ag (layer 19) | 91 Å |
| $NiCrO_x$ (layer 21) | 30 Å |
| $SnO_2$ (layer 23) | 80 Å |
| $Si_xN_y$ (layer 24) | 90 Å |
| NiCr (layer 25) | 17 Å |
| $Si_3N_4$ (layer 26) | 120 Å |

The Comparative Example (CE) had a NiCr absorbing layer similar to those in Example 1, but in the CE the absorbing layer was located only in the middle stack between the silver layers. The CE had the following layer stack from the glass outwardly.

Comparative Example

| Layer Glass (6 mm thick) | Thickness (Å) |
| --- | --- |
| $Si_xN_y$ | 257 Å |
| $ZnO_x$ | 100 Å |
| Ag | 77 Å |
| $NiCrO_x$ | 25 Å |
| $SnO_2$ | 530 Å |
| $Si_xN_y$ | 120 Å |
| NiCr | 134 Å |
| $Si_xN_y$ | 151 Å |
| $SnO_2$ | 80 Å |
| $ZnO_x$ | 80 Å |
| Ag | 197 Å |
| $NiCrO_x$ | 25 Å |
| $SnO_2$ | 142 Å |
| $Si_xN_y$ | 210 Å |

Set forth below are the optical characteristics of Example 1 compared to those of the Comparative Example (CE), measured monolithically.

Comparison Between Example 1 and Comparative Example

| Characteristic | Ex. 1 | Comparative Example |
|---|---|---|
| $T_{vis}$ (or TY)(Ill. C. 2°): | 28.9% | 41.5% |
| $a*_t$ (Ill. C. 2°): | −4.5 | −7.0 |
| $b*_t$ (Ill. C. 2°): | −13.8 | −2.5 |
| $R_fY$ (Ill. C., 2 deg.): | 9% | 32.3% |
| $a*_f$ (Ill. C., 2°): | +5.4 | +6.5 |
| $b*_f$ (Ill. C., 2°): | −19.6 | +11.0 |
| $R_gY$ (Ill. C., 2 deg.): | 19.1% | 14.5% |
| $a*_g$ (Ill. C., 2°): | −3.0 | −2.1 |
| $b*_g$ (Ill. C., 2°): | −6.1 | −10.2 |
| $R_s$ (ohms/square): | 1.8 | 1.1 |

It can be seen from the above that Example 1 had surprisingly superior (lower) visible film side reflectance ($R_fY$) than the Comparative Example (CE), even though Example 1 also had lower visible transmission (TY) than the CE, namely 9% in Example 1 compared to 32.3% in the CE. Thus, absorbing layers 4 and 25 in the lower and upper portions of the low-E coating in Example 1 (as opposed to only in the center portion as in the CE) surprisingly caused the low-E coating to have a combination of both (i) a low visible transmission, and (ii) low visible film side reflectance.

In certain example embodiments of this invention, there is provided a coated article including a coating 30 supported by a glass substrate 1, the coating comprising: first and second infrared (IR) reflecting layers comprising silver 9 and 19, wherein said IR reflecting layers 9 and 19 are spaced apart from one another by at least one dielectric layer (13, 14, 15 and/or 16) that is located therebetween, and wherein the first IR reflecting layer 9 is located closer to the glass substrate 1 than is the second IR reflecting layer 19; a first substantially metallic or metallic absorption layer comprising Ni and/or Cr 4 located such that the first absorption layer 4 is located between the glass substrate 1 and the first IR reflecting layer 9, a second substantially metallic or metallic absorption layer comprising Ni and/or Cr 25 located such that both the first and second IR reflecting layers 9 and 19 are located between the glass substrate 1 and the second absorption layer 25, and wherein the first absorption layer 4 and the second absorption layer 25 are each sandwiched between and contacting dielectric layers comprising silicon nitride (3, 5; 24, 26).

In the coated article of the immediately preceding paragraph, said first and second absorption layers may each comprise NiCr and/or NiCrN$_x$.

In the coated article of any of the preceding two paragraphs, said first and/or second absorption layers may each comprise from 1-15% nitrogen (atomic %).

In the coated article of any of the preceding three paragraphs, said first and second IR reflecting layers 9, 19 may be spaced apart by at least, moving away from the glass substrate: a layer comprising tin oxide 13, a layer comprising silicon nitride 14 and a layer comprising zinc oxide 17.

In the coated article of any of the preceding four paragraphs, in certain example embodiments there no metallic or substantially metallic absorption layer between the first and second IR reflecting layers.

In the coated article of any of the preceding five paragraphs, in certain example embodiments only two IR reflecting layers comprising silver are contained in the coating.

In the coated article of any of the preceding six paragraphs, the first absorption layer may be from about 120-200 angstroms (Å) thick.

In the coated article of any of the preceding seven paragraphs, the second absorption layer may be from about 12-30 angstroms (Å) thick.

In the coated article of any of the preceding eight paragraphs, the first absorption layer 4 may be substantially thicker than the second absorption layer 25.

In the coated article of any of the preceding nine paragraphs, said coated article may have a visible transmission of from about 20-43% (more preferably from about 24-33%), measured monolithically.

In the coated article of any of the preceding ten paragraphs, the coated article may be heat treated (e.g., thermally tempered) or not heat treated.

In the coated article of any of the preceding eleven paragraphs, in certain example embodiments the coating contains no more than two metallic or substantially metallic absorption layers comprising NiCr or NiCrN$_x$.

In the coated article of any of the preceding twelve paragraphs, the coating may further comprises a layer comprising titanium oxide 6 located between the first IR reflecting layer 9 and the first absorption layer 4.

In the coated article of any of the preceding thirteen paragraphs, said first IR reflecting layer 9 and said first absorption layer 4 may be spaced apart by at least, moving away from the glass substrate: the layer comprising silicon nitride 5 that is located over and directly contacting the first absorption layer 4, a layer comprising titanium oxide 6, and a layer comprising zinc oxide 7.

In the coated article of any of the preceding fourteen paragraphs, the coated article may have a visible film side reflectance (RfY), measured monolithically, of less than or equal to 15%, more preferably less than or equal to 12%.

In the coated article of any of the preceding fifteen paragraphs, the coated article may have a visible film side reflectance (RfY) that is less than a visible glass side reflectance (RgY) of the coated article, measured monolithically; e.g., a visible film side reflectance (RfY) that is at least 5% points less than a visible glass side reflectance (RgY) of the coated article.

In certain example embodiments of this invention, there is provided a coated article including a coating supported by a glass substrate, the coating comprising: first and second infrared (IR) reflecting layers, wherein said IR reflecting layers are spaced apart from one another by at least one dielectric layer that is located therebetween, and wherein the first IR reflecting layer is located closer to the glass substrate than is the second IR reflecting layer; a first substantially metallic or metallic absorption layer located such that the first absorption layer is located between the glass substrate and the first IR reflecting layer, a second substantially metallic or metallic absorption layer located such that both the first and second IR reflecting layers are located between the glass substrate and the second absorption layer, and wherein the first absorption layer and the second absorption layer are each sandwiched between and contacting dielectric layers comprising silicon nitride.

In the coated article of the immediately preceding paragraph, said first and second absorption layers may each comprise or consist essentially of NiCr and/or NiCrN$_x$.

In the coated article of any of the preceding two paragraphs, said first and/or second absorption layers may each comprise from 1-15% nitrogen (atomic %).

In the coated article of any of the preceding three paragraphs, said first and second IR reflecting layers may be spaced apart by at least, moving away from the glass substrate: a layer comprising tin oxide, a layer comprising silicon nitride and a layer comprising zinc oxide.

In the coated article of any of the preceding four paragraphs, in certain example embodiments there no metallic or substantially metallic absorption layer between the first and second IR reflecting layers.

In the coated article of any of the preceding five paragraphs, in certain example embodiments only two IR reflecting layers comprising silver and/or gold are contained in the coating.

In the coated article of any of the preceding six paragraphs, the first absorption layer may be from about 120-200 angstroms (Å) thick.

In the coated article of any of the preceding seven paragraphs, the second absorption layer may be from about 12-30 angstroms (Å) thick.

In the coated article of any of the preceding eight paragraphs, the first absorption layer 4 may be substantially thicker than the second absorption layer 25.

In the coated article of any of the preceding nine paragraphs, said coated article may have a visible transmission of from about 20-43% (more preferably from about 24-33%), measured monolithically.

In the coated article of any of the preceding ten paragraphs, the coated article may be heat treated (e.g., thermally tempered) or not heat treated.

In the coated article of any of the preceding eleven paragraphs, in certain example embodiments the coating may contain no more than two metallic or substantially metallic absorption layers (note: Ag or Au IR reflecting layers herein are IR reflecting layers—not absorption layers).

In the coated article of any of the preceding twelve paragraphs, the coating may further comprises a layer comprising titanium oxide located between the first IR reflecting layer and the first absorption layer.

In the coated article of any of the preceding thirteen paragraphs, said first IR reflecting layer and said first absorption layer may be spaced apart by at least, moving away from the glass substrate: the layer comprising silicon nitride that is located over and directly contacting the first absorption layer, a layer comprising titanium oxide, and a layer comprising zinc oxide.

In the coated article of any of the preceding fourteen paragraphs, the coated article may have a visible film side reflectance (RfY), measured monolithically, of less than or equal to 15%, more preferably less than or equal to 12%.

In the coated article of any of the preceding fifteen paragraphs, the coated article may have a visible film side reflectance (RfY) that is less than a visible glass side reflectance (RgY) of the coated article, measured monolithically; e.g., a visible film side reflectance (RfY) that is at least 5% points less than a visible glass side reflectance (RgY) of the coated article.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:

first and second infrared (IR) reflecting layers comprising silver, wherein said IR reflecting layers are spaced apart from one another by at least one dielectric layer that is located therebetween, and wherein the first IR reflecting layer is located closer to the glass substrate than is the second IR reflecting layer;

a first absorption layer comprising Zr located such that the first absorption layer is located between the glass substrate and the first IR reflecting layer, a second absorption layer comprising Zr located such that both the first and second IR reflecting layers are located between the glass substrate and the second absorption layer, wherein the first absorption layer and the second absorption layer are each sandwiched between and contacting dielectric layers;

wherein each of the first and second absorption layers comprises from 0-10% oxygen (atomic %) and from 1-15% nitrogen (atomic %);

wherein no metallic absorption layer is located between the first and second IR reflecting layers comprising silver;

wherein said coated article has a visible transmission of from about 20-43%, measured monolithically; and wherein, measured monolithically, the coated article has a visible film side reflectance ($R_fY$) that is lower than its visible glass side reflectance ($R_gY$).

2. The coated article of claim 1, wherein said first and second IR reflecting layers are spaced apart by at least, moving away from the glass substrate: a layer comprising tin oxide, a layer comprising silicon nitride and a layer comprising zinc oxide.

3. The coated article of claim 1, wherein only two IR reflecting layers comprising silver are contained in the coating.

4. The coated article of claim 1, wherein said coated article has a visible transmission of from about 24-33%, measured monolithically.

5. The coated article of claim 1, wherein the coated article is thermally tempered.

6. The coated article of claim 1, wherein the coating further comprises a layer comprising titanium oxide located between the first IR reflecting layer and the first absorption layer.

7. The coated article of claim 1, wherein said first IR reflecting layer and said first absorption layer are spaced apart by at least, moving away from the glass substrate: a layer comprising silicon nitride that is located over and directly contacting the first absorption layer, a layer comprising titanium oxide, and a layer comprising zinc oxide.

8. The coated article of claim 1, wherein the coated article has a visible film side reflectance (RfY), measured monolithically, of less than or equal to 15%.

9. A coated article including a coating supported by a glass substrate, the coating comprising:

first and second infrared (IR) reflecting layers comprising silver, wherein said IR reflecting layers are spaced apart from one another by at least one dielectric layer that is located therebetween, and wherein the first IR reflecting layer is located closer to the glass substrate than is the second IR reflecting layer;

a first absorption layer comprising NiCr located such that the first absorption layer is located between the glass substrate and the first IR reflecting layer, a second absorption layer comprising NiCr located such that both the first and second IR reflecting layers are located between the glass substrate and the second absorption layer, wherein the first absorption layer and the second absorption layer are each sandwiched between and contacting dielectric layers;

wherein each of the first and second absorption layers comprises from 0-10% oxygen (atomic %) and from 1-15% nitrogen (atomic %);

wherein no metallic absorption layer is located between the first and second IR reflecting layers comprising silver;

wherein said coated article has a visible transmission of from about 20-43%, measured monolithically; and wherein, measured monolithically, the coated article has a visible film side reflectance ($R_fY$) that is lower than its visible glass side reflectance ($R_gY$).

10. The coated article of claim 9, wherein said first and second IR reflecting layers are spaced apart by at least, moving away from the glass substrate: a layer comprising tin oxide, a layer comprising silicon nitride and a layer comprising zinc oxide.

11. The coated article of claim 9, wherein only two IR reflecting layers comprising silver are contained in the coating.

* * * * *